(12) United States Patent  (10) Patent No.: US 7,483,567 B2
Nishida  (45) Date of Patent: Jan. 27, 2009

(54) DEVICE, PROGRAM AND METHOD FOR GENERATING A PROFILE

(75) Inventor: Hiroshi Nishida, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 674 days.

(21) Appl. No.: 11/211,555

(22) Filed: Aug. 26, 2005

(65) Prior Publication Data

US 2006/0062441 A1  Mar. 23, 2006

(30) Foreign Application Priority Data

Sep. 22, 2004  (JP) .............................. 2004-275914

(51) Int. Cl.
*G06K 9/00* (2006.01)
(52) U.S. Cl. ...................................... 382/162
(58) Field of Classification Search ................. 382/162, 382/164–167, 173, 180–181; 358/1.9, 2.1, 358/518–520; 345/426, 593; 348/242, 253
See application file for complete search history.

(56) References Cited

U.S. PATENT DOCUMENTS

| 5,416,890 | A | * | 5/1995 | Beretta | ......................... | 345/590 |
| 6,961,461 | B2 | * | 11/2005 | MacKinnon et al. | ........ | 382/164 |
| 7,170,637 | B2 | * | 1/2007 | Murakami | .................. | 358/1.9 |
| 7,271,933 | B2 | | 9/2007 | Kato et al. | | |
| 2002/0118210 | A1 | | 8/2002 | Yuasa et al. | | |

FOREIGN PATENT DOCUMENTS

| JP | 2000-050090 | 2/2000 |
| JP | 2002-218261 | 8/2002 |
| JP | 2002-290756 | 10/2002 |
| JP | 2003-174567 | 6/2003 |
| JP | 2004-120588 | 4/2004 |

OTHER PUBLICATIONS

Japanese Office Action issued in Japanese Patent Application No. JP 2004-275914, mailed Nov. 12, 2008.

* cited by examiner

*Primary Examiner*—Jose L Couso
(74) *Attorney, Agent, or Firm*—McDermott Will & Emery LLP

(57) ABSTRACT

A profile generation device obtains image data including information on pixel locations each indicating a location of a pixel, and extracts a location as an extraction point from the image data, the location being correlated with a predetermined color value to be used for generating a profile. The profile generation device performs a color measurement on an output image, and detects a location in the output image and a colorimetric value of the location, then generates data to be used for generating the profile from a pair of the color value correlated with the extraction point and the colorimetric value correlated with the location in the output image, wherein the location corresponds to the extraction point. Consequently, the profile generation device generates the profile by using the generated data.

11 Claims, 6 Drawing Sheets

F I G. 1
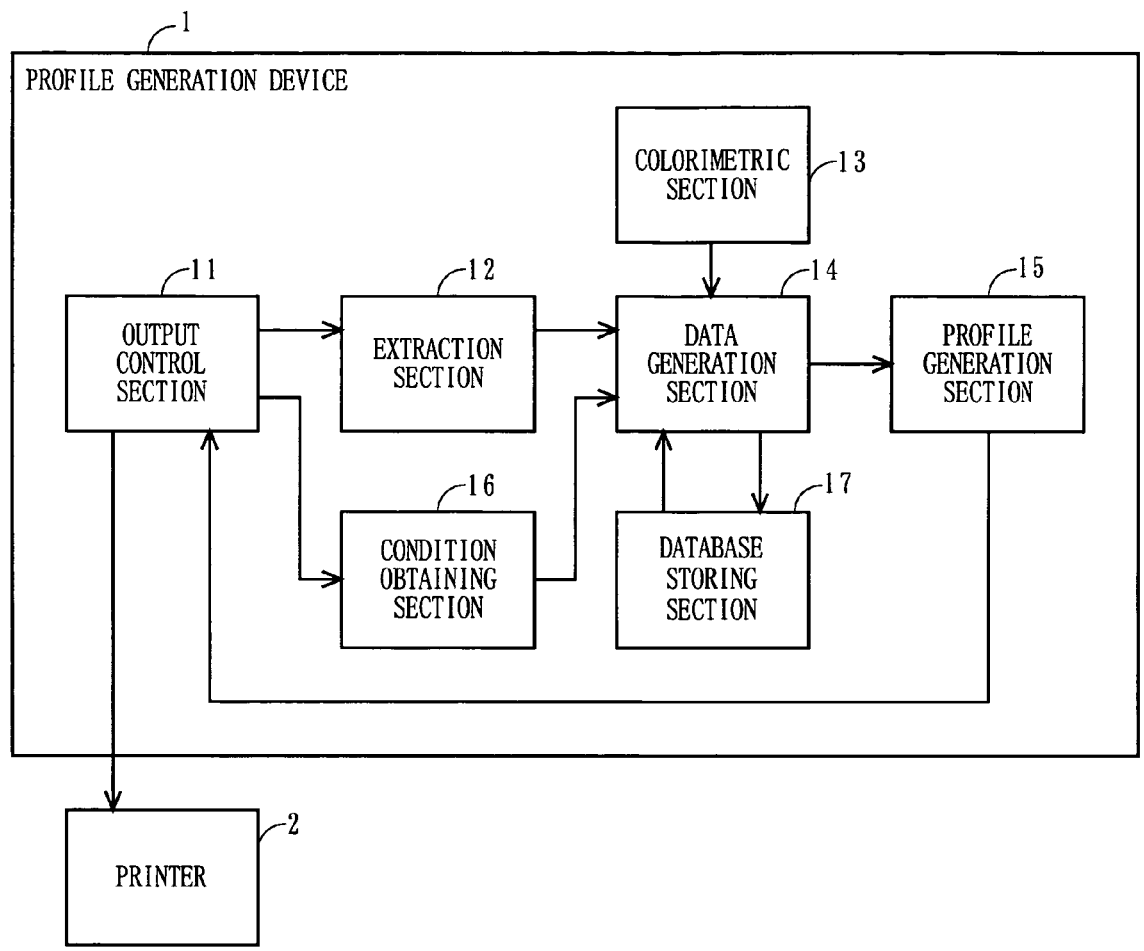

FIG. 4

| OUTPUT CONDITION | GENERATION DATA | |
|---|---|---|
| CONDITION A | GENERATION DATA A | (Lab : CMYK)<br>(Lab : CMYK)<br>⋮ |
| CONDITION B | GENERATION DATA B | (Lab : CMYK)<br>(Lab : CMYK)<br>⋮ |
| ⋮ | ⋮ | |

FIG. 5

| IMAGE IDENTIFICATION INFORMATION | EXTRACTION DATA | |
|---|---|---|
| IMAGE A | EXTRACTION DATA A | ((x, y) : (CMYK))<br>((x, y) : (CMYK))<br>⋮ |
| IMAGE B | EXTRACTION DATA B | ((x, y) : (CMYK))<br>((x, y) : (CMYK))<br>⋮ |
| ⋮ | ⋮ | |

DEVICE, PROGRAM AND METHOD FOR GENERATING A PROFILE

BACKGROUND OF THE INVENTION

1. Field of the Invention

The present invention relates to a profile generation device, and more particularly to a profile generation device for generating a profile of an output device such as a printing machine, a printer or a monitor which outputs an image.

2. Description of the Background Art

When performing a simulation on a print by a printer or the like, color space information (a profile) is required for performing a color management on the print and a simulation device (e.g., a printer, CRT, or the like), respectively. A typical method for generating a profile is to use a color chart (refer to Japanese Laid-Open Patent Publication No. 12-050090 for example). According to this method, the color chart is prepared in advance of generating a profile. For example, in a case of a print whose data is provided by a CMYK system, the color chart is generated by dividing a reproducible color space as a grid, and selecting color coordinates on grid points as color patches, wherein each color patch is associated with a combination of CMYK components. Then approximately 100 to 1000 such color patches are arranged to generate the color chart. This kind of color chart is printed or outputted from a printer and a color measurement is performed on each color patch by using a colorimeter or the like. Thus, a comparison table of values obtained by the color measurement performed on each color patch, and CMYK values of each color patch are obtained. By using an interpolation technique, a profile is obtained from the comparison table. Note that a profile for a RGB system may also be generated by employing substantially the same method.

According to a conventional method, a color measurement is performed on a color chart which is prepared separately from an image to be outputted. In other words, contents of the image to be outputted and contents of an image subjected to the color measurement (a color chart) are not consistent with each other. There is a possibility that an output condition of an output device (i.e., a factor that influences the output from the output device) may change according to the contents of the image to be outputted. Since in the conventional method, the color chart is used, which is an outputted material having contents different from the image to be outputted, the output condition may change. Especially, when the output device is a printing machine, there is high possibility that the output condition changes in accordance with the contents of the image to be outputted. If the output condition changes, a color matching accuracy may deteriorate, since an accurate profile cannot be generated even if the profile is generated based on a result of the color measurement performed on the color chart.

SUMMARY OF THE INVENTION

Therefore, an object of the present invention is to provide a profile generation device which is capable of performing a color measurement without using a color chart, and improving a color matching accuracy.

A first aspect of the present invention is directed to a profile generation device for generating a profile of an output device. The profile generation device is comprised of an extraction section, a colorimetric section, a data generation section and a profile generation section. The extraction section extracts a location as an extraction point, by obtaining image data including information on pixel locations each of which correlates with a color value, and extracts among the pixel locations, a location as an extraction point, the location being correlated with a predetermined color value to be used for generating the profile. The colorimetric section performs a color measurement on an output image, which is an output result of the image data from the output device, and detects a location in the output image and a colorimetric value of the detected location. The data generation section generates data to be used for generating the profile (hereinafter referred to as "generation data") based on a pair of the color value correlated with the extraction point extracted by the extraction section and the colorimetric value correlated with the detected location in the output image, wherein the detected location corresponds to the extraction point. The profile generation section generates the profile by using the generation data generated by the data generation section.

In a second aspect, the profile generation device may further comprise a first database storing section. The first database storing section stores a first database including a plurality of pairs each of which includes a color value of the image data and a colorimetric value of the output image. The data generation section generates new generation data by combining the pairs stored in the first database with a pair having been newly obtained by the extraction section and the colorimetric section.

In a third aspect, the profile generation device may further comprise a condition obtaining section. The condition obtaining section obtains an output condition of the output device at the time of outputting the output image subjected to the color measurement performed by the colorimetric section. The first database storing section stores the new generation data generated by the data generation section, by correlating the new generation data with the output condition obtained by the condition obtaining section. The data generation section generates the new generation data by combining, among the pairs stored in the first database, a pair which is correlated with an output condition same as the output condition obtained by the condition obtaining section, with the newly obtained pair.

In a fourth aspect, the colorimetric section may perform the color measurement only on a portion including the location corresponding to the extraction point extracted by the extraction section of the output image.

In a firth aspect, the profile generation device may further comprise a second database storing section. The second database storing section stores a second database, in which identification information of the image data from which the extraction point is extracted, is correlated with the location of the extraction point in the image data and the color value of the location. The extraction section extracts the extraction point from the image data, only when there is no information identifying the image data stored in the second database, the identification information of the image data corresponding to the output image to be subjected to the color measurement by the colorimetric section. The colorimetric section performs, when the second database includes the identification information of the image data corresponding to the output image to be subjected to the color measurement, the color measurement on only a portion of the output data including the location corresponding to the extraction point, wherein the extraction point is correlated with the information identifying the image data stored in the second database.

Note that the above invention may be provided in a form of a program (e.g., a profile generation program) to be executed by a computer of the profile generation device. Thus, by having the program executed by the computer, functions of the above invention is realized in the profile generation device. The above invention may also be provided as a profile generation method to be used in the above profile generation device.

According to the above first aspect, since the profile is generated by using the output image which is an image to be actually outputted, the color chart is not required separately. In addition, by using the actual output image, the output condition is brought closer to an actual output condition, allowing to generate a more accurate profile, consequently improving the color matching accuracy.

According to a second aspect, even if a point on which the color measurement is to be performed may not be obtained sufficiently from the image data, it is possible to generate an accurate profile by using the pair of the color value and the colorimetric value stored in the database.

According to a third aspect, the profile is generated by revising the previously generated generation data based on the newly generated generation data. In a case of an output device having a large fluctuation factor, which influences the output, it is difficult to maintain/reproduce the output condition at the time of performing the color measurement. Thus, even if the profile is generated, it is possible that the output condition (the condition other than the output condition included in the database) changes later when the output image which is used for generating the profile is actually outputted. As a result, there is a possibility that the color matching accuracy deteriorates, as the profile is not matched with the current output condition. On the other hand, according to the third aspect, it is possible to obtain a new profile matched with the output condition, by revising and regenerating the profile when there is a change in the output condition. Thus, it is possible to improve the color matching accuracy even when the output condition is changed.

According to a fourth aspect, the color measurement by the colorimetric section is not required on an entire area of the print. Thus, an amount of data obtained as a result of the color measurement is reduced.

According to a fifth aspect, by using the second database, if the color measurement is already performed on an image, the extraction point of the image does not need to be re-extracted. Thus, a process of extracting the extraction point may be omitted.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram illustrating a functional arrangement of a system including a profile generation device according to a first embodiment;

FIG. 4 is a diagram exemplifying a database stored in a database storing section 17;

FIG. 5 is a diagram exemplifying a second database stored in the database storing section 17 according to a second embodiment.

DESCRIPTION OF THE PREFERRED EMBODIMENTS

First Embodiment

FIG. 1 is a block diagram illustrating a functional arrangement of a system including a profile generation device according to a first embodiment of the present invention. The system illustrated in FIG. 1 is comprised of a profile generation device 1 and a printer 2. In the first embodiment, a case where the profile generation device is used in a system for performing a simulation on a print is exemplified. In addition, a case where a profile for a print (not shown) is generated is exemplified in the first embodiment. The system exemplified in FIG. 1 is a system for performing the simulation on the print by generating a profile of a printing machine with the profile generation device 1, and outputting an image from the printer 2 by using the profile, the image which is to be printed.

Figure 2:
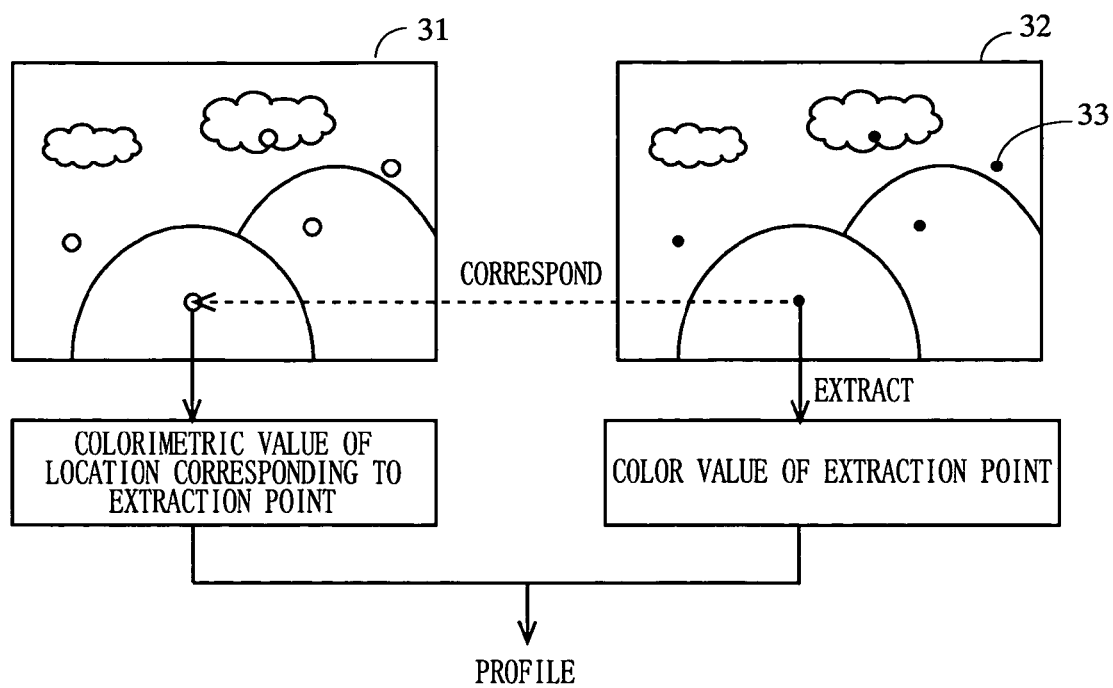
FIG. 2 is a diagram illustrating an outline of an operation of a profile generation device 1.

An outline of an operation of the profile generation device 1 according to the first embodiment will be described with reference to FIG. 2. FIG. 2 is a diagram illustrating the outline operation of the profile generation device 1. According to the first embodiment, in order to generate the profile of the printing machine, an actual print 31 as illustrated in FIG. 2 (an actual print of the image to be outputted), is used in place of a conventional color chart. On generating the profile, first the profile generation device 1 performs a color measurement on the actual print 31, i.e., on generating the profile, a user prepares in place of a color chart, the actual print 31 of the image data to be outputted and performs the color measurement on the actual print 31. Next, the profile generation device 1 extracts, from a plurality of pixel locations in image data 32, which is the original data for outputting the actual print 31, locations (shown as black dots in the image data 32), with each location having a color arrangement to be used for generating the profile. Hereinafter, one of such locations is referred to as an extraction point 33. Furthermore, the profile generation device 1 determines locations in the actual print 31 (shown as white circles in the actual print 31 of FIG. 2), with each location corresponding to a respective extraction point (shown in FIG. 2 by a dotted arrow from the extraction point 33). Then a colorimetric value of the respective location is correlated with a color value of the extraction point in the image data 32. The profile is generated based on a pair of the above colorimetric value of the actual print 31 and the color value of the image data 32. The present invention performs the color measurement by using the actual print 31, thus without employing the color chart. Below, the profile generation device 1 will be described in detail.

In FIG. 1, the profile generation device 1 is comprised of an output control section 11, an extraction section 12, a colorimetric section 13, a data generation section 14, a profile generation section 15, a condition obtaining section 16 and a database storing section 17. The colorimetric section 13 is comprised of devices such as a digital camera, a CCD sensor, or the like. The database storing section 17 is comprised of an optional storage medium (e.g., a memory, a hardware, or the like) held by the profile generation device 1. Each component excluding the colorimetric section 13 and database storing section 17 is typically realized by having a computer with a CPU and a memory to perform a prescribed program operation. In addition, an entire or a portion of each component may be realized by a dedicated hardware circuit. Below, each component of the profile generation device 1 will be described in detail.

The output control section 11 performs a control to output the image data of the image to be outputted by using the output device. For example, the output control section 11 performs RIP (Raster Image Processing) on the image data. Also, the output control section 11 outputs the image data to the extraction section 12. In the image data, information on pixel locations correlated with color values of the respective locations is included.

The extraction section 12 extracts an extraction point from the pixel locations in the image data outputted from the output control section 11. The extraction point in the image data is a location correlated with a color value to be used for generating a profile. The extraction section 12 outputs to the data generation section 14, extraction data which is the data of the extraction point correlated with the color value. Generally, since a plurality of locations in the image data are extracted as extraction points, the extraction section 12 outputs a plurality of pairs each of which includes an extraction point and a color value of the extraction point.

The colorimetric section 13 performs the color measurement on an output image outputted from the output device for which the profile is to be generated. In the first embodiment, since the output device is a printing machine, the output image is an actual print. The colorimetric section 13 performs the color measurement on the actual print. In the first embodiment, the colorimetric section 13 performs the color measurement on an entire area of the actual print. Thus, a process of the color measurement in the first embodiment is performed in an extremely short period. The colorimetric section 13 outputs a result of the color measurement to the data generation section 14. Therefore, colorimetric data representing a location in the actual print correlated therewith the colorimetric value of the location is outputted to the data generation section 14.

The condition obtaining section 16 obtains an output condition indicating a condition at the time of printing the actual print on which the color measurement is performed by the colorimetric section 13. The output condition is a condition concerned with a fluctuation factor having influence on the output from the output device for which the profile is generated. Since in the first embodiment, the output device is a printing machine, conditions as follows may be considered as the output condition (i.e., a printing condition) for example; a model/type of the printing machine, a type/thickness of a printing paper, a type of an ink, a density of the ink, a dot gain, a consumption amount of an ink, a print job name, and others. The condition obtaining section 16 may obtain the output condition from MIS (Management Information System) information or a PPF (Print Production Format) file stored in the profile generation device 1, or by a user input, and others.

The data generation section 14 generates data to be used for generating the profile (referred to as generation data) by using the extraction data outputted from the extraction section 12 and the colorimetric data outputted from the colorimetric section 13. The generation data is data including a color value of the image data having been extracted by the extraction section 12, correlated with the colorimetric value, which is a color value in the actual print obtained from the colorimetric section 13 on performing the color measurement. Therefore, the data generation section 14 generates the generation data including a pair of a color value correlated with an extraction point extracted by the extraction section 12, and the colorimetric value correlated with the location in the actual print, wherein the location corresponds to the extraction point.

According to the first embodiment, the data generation section 14 allows the database storing section 17 to store a database in which the output condition obtained by the condition obtaining section 16 is correlated with the generation data. The database storing section 17 stores such database in which the output condition is correlated with the generation data generated by the data generation section 14. The output condition which is correlated with the generation data is an output condition at the time of outputting the actual print subjected to the color measurement for obtaining the colorimetric value.

Furthermore, the data generation section 14 combines, when the generation data with the correlated output condition same as an output condition of newly generated data exists in the database stored in the storing section 17, the stored generation data with the newly generated generation data. Then, outputs the combined generation data to the profile generation section 15. On the other hand, when there is no generation data with the correlated output condition same as the output condition of the newly generated generation data in the database stored in the storing section 17, the data generation section 14 outputs the newly generated generation data to the profile generation section 15.

The profile generation section 15 generates the profile by using the generation data outputted from the data generation section 14. To be more specific, the profile generation section 15 generates the profile from a pair of a color value and a colorimetric value of the image data by using an interpolation.

According to the first embodiment, the profile of the printing machine is generated as mentioned above. When performing a simulation, the output control section 11 performs a process such as a RIP process by using the profile, and an image for the simulation is outputted from the printer 2. Note that though a printer is used as a simulation device in the first embodiment, the simulation may be performed by using a device such as a DDCP (Direct Digital Color Proofer) for example.

Figure 3:
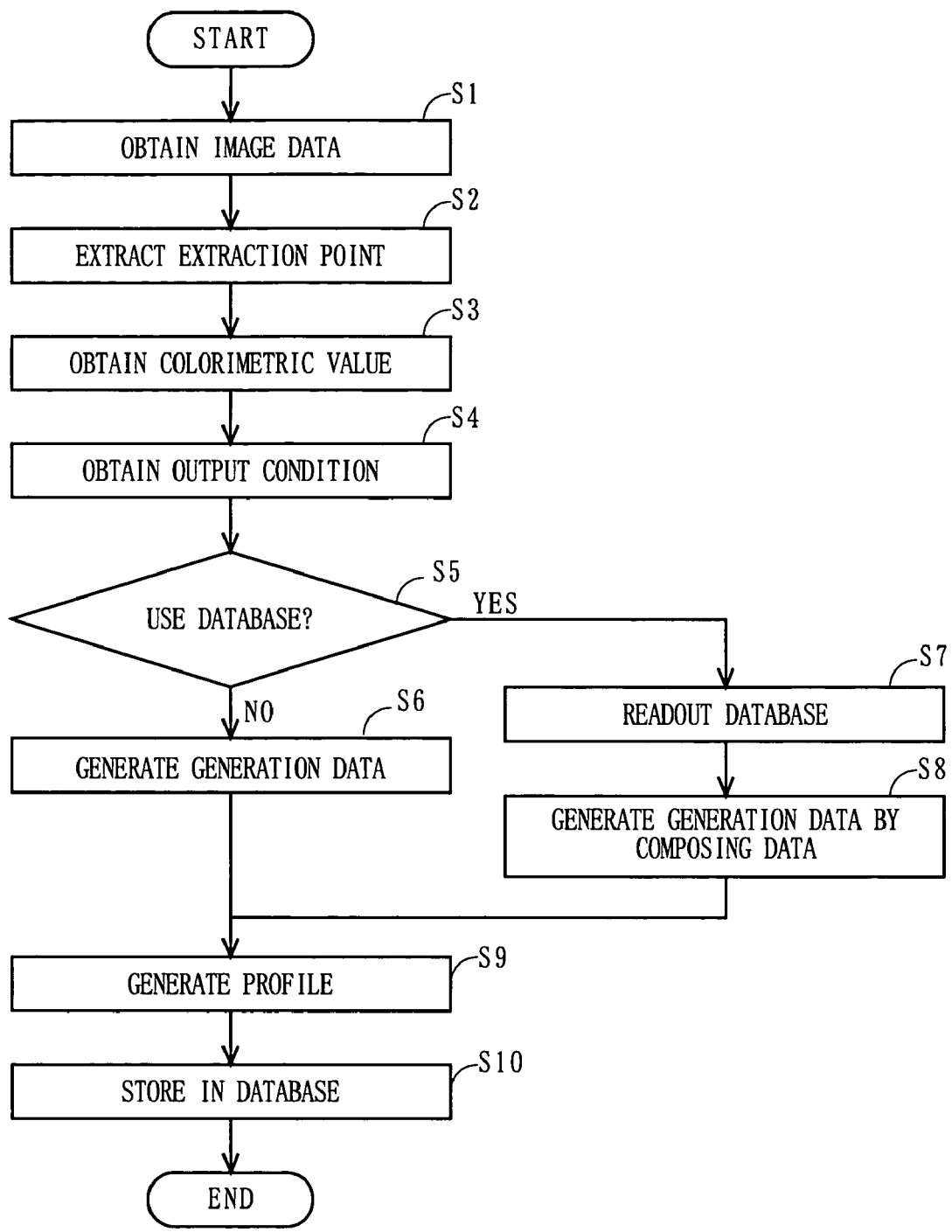
FIG. 3 is a flowchart illustrating a flow of a process performed in the profile generation device 1.

Next, a detailed process of the profile generation device according to the first embodiment will be described. FIG. 3 is a flowchart illustrating a flow of a process performed by the profile generation device 1. Before executing the process shown in FIG. 3, the user prints from the printing machine, the actual print to be subjected to the color measurement. The output control section 11 may either perform the printing without using a profile or by using a prescribed profile prepared beforehand.

First in step S1, the extraction section 12 obtains image data corresponding to the actual print. The image data may be any image data included in a PPF file which is a standard format of the CIP3 (International Cooperation for Integration of Prepress, Press and Postpress). The extraction section 12 obtains the image data included in the PPF file held by the output control section 11. The image data includes information on pixel locations (shown by x,y coordinates in the present invention) correlated with color values of the respective locations (shown in CMYK values in the present invention). Note that though the image data obtained from the PPF file is used in the above description, it is not limited thereto, image data included in a TIFF (Tagged Image File Format) or PNG (Portable Network Graphics) format which are used in the same purpose as the PPF file may be used as well.

Next in step S2, the extraction section 12 extracts an extraction point from the pixel locations in the image data obtained at step S1. Specifically, a color value of the location to be extracted as the extraction point is predetermined, and the extraction section 12 extracts a pixel location having the predetermined color value as the extraction point. In a case where color values of the image data are presented as CMYK values, points as follows are typically extracted as extraction points:

(1) a point on a blank space;
(2) a point indicating a primary color tone;
(3) a point indicating a secondary color tone;
(4) a point indicating a tone of a primary color with a K component;
(5) a point indicating a tertiary color tone;
(6) a point indicating a tone of a secondary color with a K component; and
(7) a point indicating a tone of a tertiary color with a K component.

The point described in (1), which is provided on a blank space, is a point with a color value where value of each CMYK component is zero (i.e., a point with a CMYK value of (0, 0, 0, 0). The point in (2), which indicates a primary color tone, is a point with a color value where a value of a single component among the C, M or Y components, or only a value of the K component is not zero. The point in (3), which indicates a secondary color tone, is a point with a color value where values of two components among the C, M and Y components are not zero. The point in (4), which indicates a tone of a primary color with a K component, is a point with a color value where a value of a single component among the C, M and Y components, and the K component are not zero. The point in (5), which indicates a tertiary color tone, is the point with a color value where value of each C, M and Y component is not zero. The point in (6), which indicates a tone of a secondary color with a K component, is a point with a color value where values of two components among the C, M and Y components, and the value of the K component are not zero. The point in (7), which indicates a tone of a tertiary color with a K component, is a point with a color value where value of each CMYK component is not zero. Specific color values corresponding to the points described in (1) to (7) are predetermined in the extraction section 12. Generally, a plurality of specific color values are predetermined for each point described in (2) to (7). For example, in a case of the above mentioned (3), a plurality of color values which values of CM components, MY components and YC components are not zero are prepared respectively.

Specifically, in step S2, the extraction section 12 repeatedly performs the following process for each pixel of the image data obtained at step S1. First a process of determining whether a pixel is applicable to any one of the points described above in (1) to (7) or not is performed. This decision is made on whether a color value of the pixel in the image data matches with any one of the color values of the points described in (1) to (7). Next, in a case where the pixel applies to any one of the points in (1) to (7), a process to extract the pixel as an extraction point is performed. Thus, a pair of a location and a color value of the pixel is outputted to the data generation section 14. The extraction section 12 performs the above process for every pixel of the image data obtained at step S1. As a result of step S2, extraction data is outputted to the data generation section 14. The extraction data includes a plurality of pairs of locations in the image data (x,y coordinate values) and color values of the respective locations (CMYK values). The CMYK values of the pairs are predetermined color values provided for the points in (1) to (7), and the x,y coordinate values indicate the pixel locations of the respective color values.

There are cases depending on contents of the image data where there is no color value corresponding to the points described above in (1) to (7). That is, there are cases when there is no pixel in the image data having the color value matched with the color values of the points in (1) to (7). In such cases, no extraction point with a color value matched with the above points is extracted in step S2.

Next in step S3, the data generation section 14 obtains a colorimetric value of the actual print. The colorimetric section 13 performs the color measurement on the entire area of the actual print. Thereby a pair of a location in the actual print (shown by X,Y coordinates) and a colorimetric value of the location (shown in a Lab value) is obtained. This pair is outputted to the data generation section 14 from the colorimetric section 13. Thus, the colorimetric data is outputted to the data generation section 14 from the colorimetric section 13 in step S3. The colorimetric data includes a plurality of pairs of locations (X,Y coordinate values) in the actual print and colorimetric values (Lab values) of the respective locations. Consequently, the data generation section 14 obtains the colorimetric values of the actual print.

Next in step S4, the condition obtaining section 16 obtains an output condition. The obtained output condition is an output condition (i.e., a printing condition) at the time of printing the actual print which is subjected to the color measurement performed in step S3. In a case where the output condition is based on factors such as a model name of a printing machine, a type of a printing paper, or an ink, for example, the output condition is obtainable from information on a process control which is stored in the profile generation device. On the other hand, in a case where the output condition is based on factors such as an ink density, a dot gain, a consumption amount of an ink or a print job name, the output condition is obtainable from the PPF file stored in the profile generation device. Though it is preferable to automatically obtain the output condition from data stored in the profile generation device 1, it may also be obtained through a user input.

In step S5, the data generation section 14 determines whether to use contents of the database stored in the database storing section 17 for generating the generation data. In step S5, whether generation data with a correlated output condition same as the output condition obtained in step S4 is stored or not is determined. When such generation data is stored in the database, it is determined to use the contents of the database stored in the database storing section 17. On the other hand, when such generation data is not stored in the database, it is determined not to use the contents of the database stored in the database storing section 17. When determined in step S5 to use the contents of the database stored in the database storing section 17, processes of steps S7 and S8 are performed. On the other hand, when determined in step S5 not to use the contents of the database stored in the database storing section 17, a process of step S6 is performed.

In step S6, the data generation section 14 generates the generation data by using the extraction data and the colorimetric data generated in steps S2 and S3. For generating the generation data, the extraction data inputted from the extraction section 12 in step S2 (the pairs of the x,y coordinate values and the CMYK values), and the colorimetric data inputted from the colorimetric section 13 in step S3 (the pairs of the X,Y coordinate values and the Lab values) are used. Below, a method of generating the generation data will be explained in detail.

The data generation section 14 first calculates X,Y coordinate values each corresponding to respective x, y coordinate values. For example, by adjusting a direction and a view angle of a camera of the colorimetric section 13, a direction and a size are made consistent between the image data which is obtained as a result of the color measurement on the actual print, and the original image data. Since the x,y coordinates are consistent with the X,Y coordinates, a X,Y coordinate value having a same value as a x,y coordinate value is considered as a X,Y coordinate value corresponding to the x,y coordinate value. In addition, by adjusting the angle of the camera of the colorimetric section 13, it is possible to match a direction of the image data obtained as a result of the color measurement on the actual print, with the original image data. The X,Y coordinate value corresponding to the x,y coordinate value may be calculated, for example, by multiplying the x,y coordinate value by a constant. The correlation between the x,y coordinate values and the X,Y coordinate values may also be obtained by performing a pattern matching between the image data obtained as a result of the color measurement on the actual print and the original image data.

Once a correlation between the x,y coordinate values and the X,Y coordinate values is obtained, the data generation section 14 generates a pair of a color value (a CMYK value) correlated with a x,y coordinate value, and a colorimetric value (a Lab value) correlated with a X,Y coordinate value which corresponds to the x,y coordinate value. To be more specific, the data generation section 14 selects, among the colorimetric data, the X,Y coordinate value corresponding to the x,y coordinate value for each extraction point included in the extraction data. Then, the pair of the CMYK value correlated with the x, y coordinate value of the extraction point, and the Lab value correlated with the X,Y coordinate value is generated. Consequently, the generation data comprised of the pair of the CMYK value and the Lab value is generated. At the end, the data generation section 14 processes the generation data into a format applicable to the profile generation section 15 and outputs to the profile generation section 15. Subsequent to the above step S6, a process of step S9 is performed.

On the other hand, the data generation section 14 read outs the contents of the database stored in the database storing section 17 in step S7. Within the contents of the database, the generation data which is correlated with an output condition same as the output condition obtained in step S4 is read out. FIG. 4, is a diagram exemplifying the database stored in the database storing section 17. As shown in FIG. 4, the output condition in the database is correlated with the generation data obtained from the colorimetric data resulting from the color measurement performed on the actual print outputted under the relevant output condition. Note that a plurality of pairs of the CMYK values and the Lab values are included in the generation data. Referring to FIG. 4 for example, if the output condition obtained at step S4 is consistent with an output condition A, the data generation section 14 read outs from the database, the generation data which is correlated with the output condition A.

In the subsequent step S8, the data generation section 14 generates new generation data, by using the generation data generated from the extraction data and the colorimetric data generated in steps S2 and S3, and the generation data read out in step S7. The data generation section 14, first performs a process same as in step S6. Consequently, from the extraction data and the colorimetric data, the new generation data comprised of the pairs of the CMYK values and the Lab values is generated. Furthermore, the data generation section 14 revises the generation data read out from the database in step S7, based on the newly generated generation data. Looking into the pairs of the CMYK values and the Lab values included in the newly generated generation data, and pairs of a CMYK values and a Lab values in the generation data stored in the database, there may be a case when pairs having the same CMYK value exist. The pairs having the same CMYK value means that they have the same extraction point. For such pairs having the same extraction point, the pair in the newly generated generation data is kept, and the pair included in the generation data stored in the database is deleted. All pairs with different CMYK values are kept. Note that in another embodiment, the pair included in the newly generated generation data may be simply added to the pair included in the generation data stored in the database. By the above step S8, the new generation data is generated by using the generation data stored in the database. As same as step S6, the generated generation data is processed by the data generation section 14 into a format applicable to the profile generation section 15, and outputted to the profile generation section 15. Subsequent to the step S8, a process of step S9 is performed.

In step S9, the profile generation section 15 generates the profile by using the generation data outputted from the data generation section 14 in step S6 or S8. Note that a function of the profile generation section 15 may be realized by a commonly used software for generating a profile. As an example of the software for generating a profile, product such as Labfit (registered trademark in Japan) of Dainippon Screen Mfg. Co., Ltd may be used.

In step S10, the data generation section 14 stores in the database, the new generation data generated in step S6 or S8. In a case of the generation data generated in step S6, the data generation section 14 stores the generation data in the database by correlating the data with the output condition obtained in step S4. Thereby, the generation data on the new output condition is supplemented in the database. On the other hand, in a case of the generation data generated in step S8, the data generation section 14 updates the contents of the generation data read out in step S7 to the contents of the generation data generated in step S8. Accordingly, the contents of the generation data is revised to have more accuracy. The description of the flowchart in FIG. 3 is concluded here.

As described above, according to the first embodiment, the profile is generated by using the print of the image to be actually outputted. Thus, the profile is allowed to be generated without a color chart prepared separately. In addition, by using the print of the image to be actually outputted, the output condition is brought closer to an actual output condition, thus allowing a more accurate profile to be generated. Consequently, a color matching accuracy at the time of simulating the print is improved.

In a case of a conventional color measurement method by using a color chart, when performing a color measurement on color patches of the color chart, it is necessary to perform the color measurement for each color patch by using a colorimeter. Thus, it requires a considerable amount of time to perform the color measurement on a large amount of color patches. While according to the first embodiment, a time required for a color measurement process is reduced significantly, since the color measurement is performed on the entire area of the print at once (step S3 shown in FIG. 3).

Furthermore, according to the first embodiment, since the color measurement is performed by using the actual print, it is possible to regenerate the profile even when outputting the actual print after performing a simulation. Especially for a printing machine, there is a concern that an output condition at the time of generating a profile (i.e., the output condition other than the output condition included in the database) may have changed by the time of printing. This concern is solved in the first embodiment by regenerating the profile, thus improving the color matching accuracy even when the output condition is changed. Note that though a general-purpose CIE coordinate space is employed in the above description, a local color coordinate system such as a RGB color coordinate system may be used.

Second Embodiment

Next, a profile generation device according to a second embodiment will be described. In the second embodiment, the colorimetric section 13 performs the color measurement only on a necessary portion corresponding to an extraction point of an actual print instead of performing on the entire area of the actual print. Thus in the second embodiment, unnecessary color measurement is omitted. The profile generation device according to the second embodiment is described below on focusing on the difference from the first embodiment. Since an arrangement of a system according to the second embodiment is same as the arrangement shown in FIG. 1, detail description will be omitted.

According to the second embodiment, a database shown in FIG. 5 (referred to as a second database in the second embodiment) is stored in the database storing section 17 in addition to the database shown in FIG. 4 (referred to as a first database in the second embodiment). FIG. 5, is a diagram exemplifying the second database stored in the database storing section 17 according to the second embodiment. The second database stores image identification information correlated with the above extraction data. The image identification information is information for identifying an image of the actual print which is to be subjected to the color measurement, such as a name of image data of the image, for example. The extraction data is the data on the image data from which the extraction point is previously extracted by the extraction section 12. As described previously, the extraction data is the data including the pair of a location indicated in x,y coordinates, the location in the image data which is to be extracted as an extraction point, and a color value (a CMYK value) of the location. By referring to this database, it is possible to know which location in the image data identified by the image identification information, is to become the extraction point.

Figure 6:
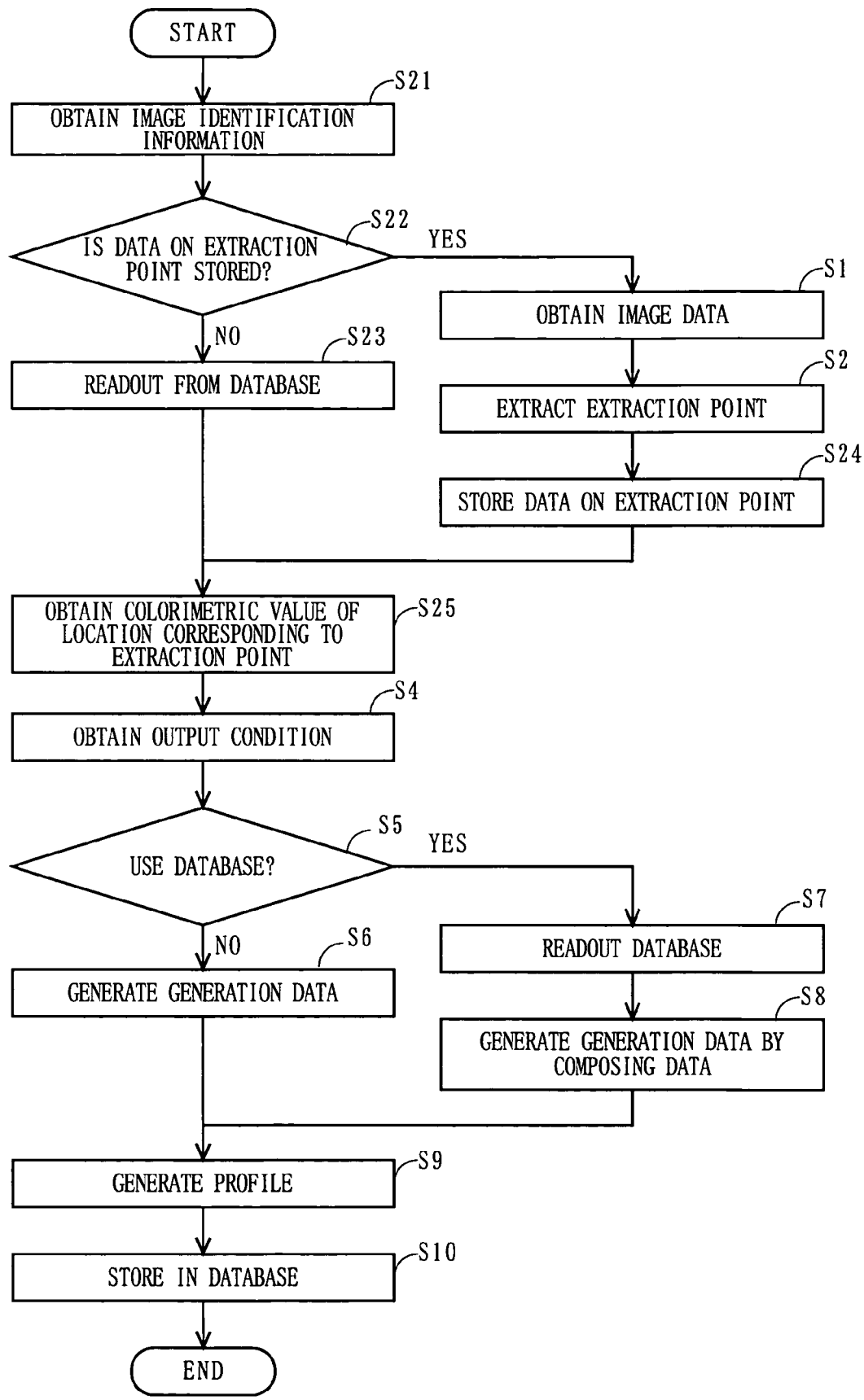
FIG. 6 is a flowchart illustrating a flow of a process performed in a profile generation device according to the second embodiment.

FIG. 6 is a flowchart illustrating a flow of a process performed by the profile generation device according to the second embodiment. As same as the first embodiment, before executing the process shown in FIG. 5, the user prints the actual print from a printing machine, the actual print which is to be subjected to the color measurement.

In step S21 of FIG. 6, first the image identification information is obtained by the extraction section 12. The image identification information obtained here is the information indicating an image which is to be subjected to the color measurement. Note that the image identification information may be obtained from the data stored in the profile generation device 1, or may be obtained through an user input. Next in step S22, the extraction section 12 determines whether the image identification information obtained in step S21 is stored in the second database or not. In a case where the image data is stored in the second database, a process of step S23 is performed. On the other hand, when the image data is not stored in the second database, processes of steps S1 and S2 are performed.

In step S23, the extraction section 12 read outs, from the second database, extraction data which is correlated with the image identification information obtained in step S21. The read out extraction data is outputted to the colorimetric section 13. Subsequent to step S23, a process of step S25 is performed.

On the other hand, the processes of steps S1 and S2 are same as the first embodiment. However in the second embodiment, the extraction data generated in step S2 is outputted to the colorimetric section 13. In step S24 subsequent to step S2, the extraction section 12 stores in the second database, the image identification information obtained in step S21 correlated with the extraction data generated in step S2. Subsequent to step S23 or step S24, a process of step S25 is performed.

Next in step S25, the colorimetric section 13 performs the color measurement on the location corresponding to the extraction point based on the extraction data outputted from the extraction section 12 in step S23, or on the extraction data outputted from the extraction section 12 in step S2. In the second embodiment, the colorimetric section 13 comprises a mechanism capable of moving a camera to any location in the actual print for performing the color measurement, and performs the color measurement on the location corresponding to the extraction point instead of performing the color measurement on the entire area of the actual print. As a result of the color measurement, the colorimetric section 13 outputs to the data generation section 14, only a colorimetric value of the extraction point. The processes of step S4 and after are same as the first embodiment.

As described above, according to the second embodiment, it is not necessary for the colorimetric section 13 to perform the color measurement on the entire area of the actual print. Furthermore, by employing the second embodiment, if the color measurement is already performed on the image, it is not necessary to repeat the process of extracting the extraction point. Thus, the process of extracting the extraction point may be omitted.

The above first and second embodiments exemplifies a case where the output device is a printing machine, thus generating the profile for the printing machine. Also, an example of performing a simulation of a print by using a printer is described. However, the profile generation device according to the present invention is not limited to the manner presented in the first and second embodiments, and may be used to generate the profile for other output devices, and for various purposes. For example, the profile generation device is capable of generating the profile for a printer or a DDCP, by performing the color measurement on an outputted material from the printer or the DDCP. As an output condition when generating the profile for the printer or DDCP, conditions such as a model name of the printer or the DDCP, an outputting paper (type or thickness), and an output mode (high-resolution mode, high-speed mode, etc.) may be considered. These output conditions may be obtained through a user input, for example. Furthermore, the use of the profile generation device is not limited for generating the profile for output devices such as the printer or the DDCP, it may also be used for an output device such as a monitor.

The above first and second embodiments exemplifies a case where the color value of the image data is provided in a CMYK value. However, the present invention may be applied for other embodiments where the color value of the image data may be provided in any format. For example, the color value of the image data may be presented in a RGB value as in the case of generating the profile for an output device such as the monitor. When a special color is used in addition to the CMYK components for printing, a color value including a value of a component of the special color may be used in addition to the CMYK components. For example, in a case where a R component is included in the color value of the image data as a special color in addition to the CMYK components, the extraction point may be established for five components of the CMYK and R components as same as established in the above descriptions (1) to (7).

The above first and second embodiments exemplifies a case where color measurement means such as a camera which comprises the colorimetric section 13 is connected integrally with the profile generation device. However, in the first embodiment, the colorimetric section 13 may be provided separately from the profile generation device without requiring constant online connection. For example, the colorimetric section 13 may perform the color measurement on the print beforehand, when generating the profile, thereby having the profile generation device to perform the process of obtaining the colorimetric data from the colorimetric section 13 (step S3).

The present invention may be used as a profile generation device for generating a profile of an output device such as a printing machine, a printer or a monitor, which outputs an image.

While the invention has been described in detail, the foregoing description is in all aspects illustrative and not restrictive. It is understood that numerous other modifications and variations can be devised without departing from the scope of the invention.

What is claimed is:

1. A profile generation device for generating a profile for an output device, the profile generation device comprising:
   an extraction section for obtaining image data including information on pixel locations each of which correlates with a color value, and extracting among the pixel locations, a location as an extraction point, the location being correlated with a predetermined color value to be used for generating the profile;
   a colorimetric section for performing a color measurement on an output image, which is an output result of the image data from the output device, and detecting a location in the output image and a colorimetric value of the detected location;
   a data generation section for generating data to be used for generating the profile based on a pair of the color value correlated with the extraction point extracted by the extraction section and the colorimetric value correlated with the detected location in the output image, wherein the detected location corresponds to the extraction point; and
   a profile generation section for generating the profile by using the data generated by the data generation section.

2. The profile generation device according to claim 1, further comprising a first database storing section for storing a first database including a plurality of pairs each of which includes a color value of the image data and a colorimetric value of the output image, wherein
   the data generation section generates new data to be used for generating the profile, by combining the pairs stored in the first database with a pair having been newly obtained by the extraction section and the colorimetric section.

3. The profile generation device according to claim 2, further comprising a condition obtaining section for obtaining an output condition of the output device at a time of outputting the output image subjected to the color measurement performed by the colorimetric section, wherein
   the first database storing section stores the new data generated by the data generation section to be used for generating the profile, by correlating the new data with the output condition obtained by the condition obtaining section, and
   the data generation section generates the new data to be used for generating the profile, by combining, among the pairs stored in the first database, a pair which is correlated with an output condition same as the output condition obtained by the condition obtaining section, with the newly obtained pair.

4. The profile generation device according to claim 1, wherein the colorimetric section performs the color measurement only on a portion, including the location corresponding to the extraction point extracted by the extraction section, of the output image.

5. The profile generation device according to claim 4, further comprising a second database storing section for storing a second database, in which identification information of the image data from which the extraction point is extracted is correlated with the location of the extraction point in the image data and the color value of the location, wherein
   the extraction section extracts the extraction point from the image data, only when there is no identification information stored in the second database, the identification information which identifies the image data corresponding to the output image to be subjected to the color measurement by the colorimetric section, and
   the colorimetric section performs, when the second database includes the identification information of the image data corresponding to the output image to be subjected to the color measurement, the color measurement on only a portion including the location corresponding to the extraction point, wherein the extraction point is correlated with the identification information of the image data stored in the second database.

6. A profile generation program stored on a computer readable medium to be executed by a computer of a profile generation device for generating a profile for an output device, the profile generation program causing the computer to function as:
   extraction means for obtaining image data including information on pixel locations each of which correlates with a color value, and extracting among the pixel locations, a location as an extraction point, the location being correlated with a predetermined color value to be used for generating the profile;
   colorimetric means for performing a color measurement on an output image, which is an output result of the image data from the output device, and detecting a location in the output image and a colorimetric value of the detected location;
   data generation means for generating data to be used for generating the profile based on a pair of the color value correlated with the extraction point extracted by the extraction means and the colorimetric value correlated with the detected location in the output image, wherein the detected location corresponds to the extraction point; and
   profile generation means for generating the profile by using the data generated by the data generation means.

7. The profile generation program according to claim 6, wherein
   the profile generation device stores a first database including a plurality of pairs each of which includes a color value of the image data and a colorimetric value of the output image, and
   the data generation means generates new data to be used for generating the profile, by combining the pairs stored in the first database with a pair having been newly obtained by the extraction means and the colorimetric means.

8. The profile generation program according to claim 7, causing the computer to further function as condition obtaining means for obtaining an output condition of the output device at a time of outputting the output image subjected to the color measurement performed by the colorimetric means, wherein the first database stores the new data generated by the data generation means to be used for generating the profile, by correlating the new data with the output condition obtained by the condition obtaining means, and the data generation means generates the new data for generating the profile, by combining, among the pairs stored in the first database, a pair which is correlated with an output condition same as the output condition obtained by the condition obtaining means, with the newly obtained pair.

9. The profile generation program according to claim 6, wherein the colorimetric means performs the color measurement only on a portion, including the location corresponding to the extraction point extracted by the extraction means, of the output image.

10. The profile generation program according to claim 9, wherein the profile generation device stores a second database, in which identification information of the image data from which the extraction point is extracted is correlated with the location of the extraction point in the image data and the color value of the location, the extraction means extracts the extraction point from the image data, only when there is no identification information stored in the second database, the identification information which identifies the image data corresponding to the output image to be subjected to the color measurement by the colorimetric means, and the colorimetric means performs, when the second database includes the identification information of the image data corresponding to the output image to be subjected to the color measurement, the color measurement on only a portion including the location corresponding to the extraction point, wherein the extraction point is correlated with the identification information of the image data stored in the second database.

11. A profile generation method for generating a profile for an output device, including:

an extraction step for obtaining image data including information on pixel locations each of which correlates with a color value, and extracting among the pixel locations, a location as an extraction point, the location being correlated with a predetermined color value to be used for generating the profile;

a colorimetric step for performing a color measurement on an output image, which is an output result of the image data from the output device, and detecting a location in the output image and a colorimetric value of the detected location;

a data generation step for generating data to be used for generating the profile based on a pair of the color value correlated with the extraction point extracted by the extraction step and the colorimetric value correlated with the detected location in the output image, wherein the detected location corresponds to the extraction point; and a profile generation step for generating the profile by using the data generated by the data generation step.

* * * * *